US008668410B1

(12) United States Patent
Arana et al.

(10) Patent No.: US 8,668,410 B1
(45) Date of Patent: Mar. 11, 2014

(54) DRILLING SYSTEM STABILIZATION

(75) Inventors: Steve L. Arana, Maryville, IL (US); Ike C. Schevers, Festus, MO (US); David L. Fritsche, Foristell, MO (US)

(73) Assignee: The Boeing Company, Chicago, IL (US)

( * ) Notice: Subject to any disclaimer, the term of this patent is extended or adjusted under 35 U.S.C. 154(b) by 1116 days.

(21) Appl. No.: 12/618,003

(22) Filed: Nov. 13, 2009

(51) Int. Cl.
*B23B 45/14* (2006.01)
(52) U.S. Cl.
USPC .............. 408/113; 408/1 R; 408/95; 408/97; 408/110; 408/115 R; 409/178; 409/185; 409/186
(58) Field of Classification Search
USPC .................. 409/178, 179, 185, 186
See application file for complete search history.

(56) References Cited

U.S. PATENT DOCUMENTS 6,015,249 A * 1/2000 Sacchetti ................ 409/186
2007/0147968 A1 6/2007 Nappier et al.

OTHER PUBLICATIONS

Andrews Tool Co. Inc. catalogue, Arlington, TX, retrieved Nov. 2009, pp. 1-37 http://www.andrewstool.com/.
Carr Lane USA catalog, Carr Lane Manufacturing Co., St. Louis Missouri, retrieved Nov. 2009, 1 page http://www.carrlane.com/catalog/index.cfm.
ATI Tools—Airframe Tooling for Production & Maintenance, pp. 1-2, retrieved Nov. 2009 http://www.atitools.com/newcatalog.html.

* cited by examiner

*Primary Examiner* — Richard Chang
(74) *Attorney, Agent, or Firm* — Yee & Associates, P.C.

(57) ABSTRACT

In an advantageous embodiment, an apparatus comprises a housing associated with a machine, a shaft, a sleeve, and a biasing system. The shaft is associated with the housing, and the shaft has an end configured to receive a tool. The shaft is configured to be rotated by the machine about an axis of rotation extending through the shaft. The sleeve is associated with the housing, and the sleeve has a channel that is configured to receive the shaft. The biasing system is associated with the housing and configured to move the sleeve along the axis of rotation against a workpiece on which a drilling operation is performed during which a sleeve end presses against the workpiece with a force while the shaft with the tool is rotated by the machine.

17 Claims, 9 Drawing Sheets

DRILLING SYSTEM STABILIZATION

BACKGROUND INFORMATION

1. Field

The present disclosure relates generally to manufacturing, and in particular, to a method and apparatus for operating a drilling system. Still more particularly, the present disclosure relates to a method and apparatus for stabilizing a drilling system.

2. Background

Motorized tools are commonly used to perform operations on workpieces in the manufacturing of products. A workpiece may be a product, a component of a product, or subcomponent of a product. In manufacturing a product, an operator of a motorized tool may desire to create a hole in a number of layers of the workpiece. One reason to create a hole in the number of layers is to create a point where a fastener may be attached to or inserted into the layers. One type of fastener is a screw or a bolt.

A motorized drill is an example of a motorized tool used for creating a hole in a workpiece. A motor in the motorized drill converts energy into rotational energy. In some examples, the energy is in the form of electricity. In other examples, the energy is in the form of compressed air or another suitable energy source. The rotational energy is transferred to a cutting tool that rotates and travels along an axis of rotation. As the cutting tool travels along the axis of rotation, the cutting tool creates a hole in the number of layers of the workpiece by applying a force to the workpiece. The process of creating a hole in the number of layers using the motorized drill is referred to herein as a drilling operation. The cutting tool used in a drilling operation may be a drill tool. For example, a cutting tool used in a drilling operation may be a drill bit.

Because the motorized drill applies force to the workpiece during the drilling operation, the workpiece and/or the drill may move during the drilling operation. In some examples, the movement may be lateral. In other examples, the movement may cause the drill to create the hole at an angle other than the angle desired by the operator of the motorized drill. The hole created in the number of layers of a workpiece during a drilling operation in which the drill and/or number of layers are moved may be of a different size, shape, angle, position, or other property than the operator of the motorized drill desired.

Accordingly, it would be advantageous to have a method and apparatus which takes into account one or more of the issues discussed above, as well as possibly other issues.

SUMMARY

In an advantageous embodiment, an apparatus comprises a housing associated with a machine, a shaft, a sleeve, and a biasing system. The shaft is associated with the housing, and the shaft has an end configured to receive a tool. The shaft is configured to be rotated by the machine about an axis of rotation extending through the shaft. The sleeve is associated with the housing, and the sleeve has a channel that is configured to receive the shaft. The biasing system is associated with the housing and configured to move the sleeve along the axis of rotation against a workpiece on which a drilling operation is performed during which a sleeve end presses against the workpiece with a force while the shaft with the tool is rotated by the machine.

In another advantageous embodiment, an apparatus comprises a housing removably attached to a number of rods using an adapter plate. The number of rods are associated with a drill containing a drilling motor such that the drilling motor moves along the number of rods during a drilling operation. The apparatus further comprises a shaft having a first end configured to receive a drill tool and a second end configured to receive a spindle associated with the drilling motor. The shaft is configured to be rotated by the spindle about an axis of rotation when the spindle is caused to rotate by the drilling motor. The apparatus comprises a sleeve associated with the housing. The sleeve has a channel that is configured to receive the shaft. The apparatus further comprises a piston at least partially contained within the housing and configured to press a sleeve end against a workpiece during a drilling operation with a force while the shaft is rotated by the spindle.

In yet another advantageous embodiment, a method for operating a drilling system comprises positioning the drilling system relative to a workpiece. The drilling system comprises a housing associated with a machine, a shaft associated with the housing, the shaft having an end configured to receive a tool, the shaft being configured to be rotated by the machine about an axis of rotation extending through the shaft, a sleeve associated with the housing, wherein the sleeve has a channel that is configured to receive the shaft, and a biasing system associated with the housing and configured to move the sleeve along the axis of rotation against a workpiece on which a drilling operation is performed during which a sleeve end presses against the workpiece with a force while the shaft with the tool is rotated by the machine. The method then performs a number of operations on the workpiece using the drilling system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
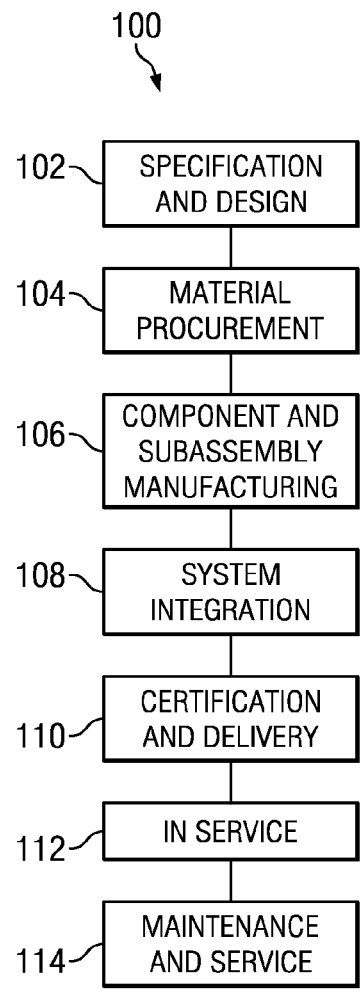
FIG. 1 depicts an illustration of an aircraft manufacturing and service method in accordance with an advantageous embodiment.
Figure 2:
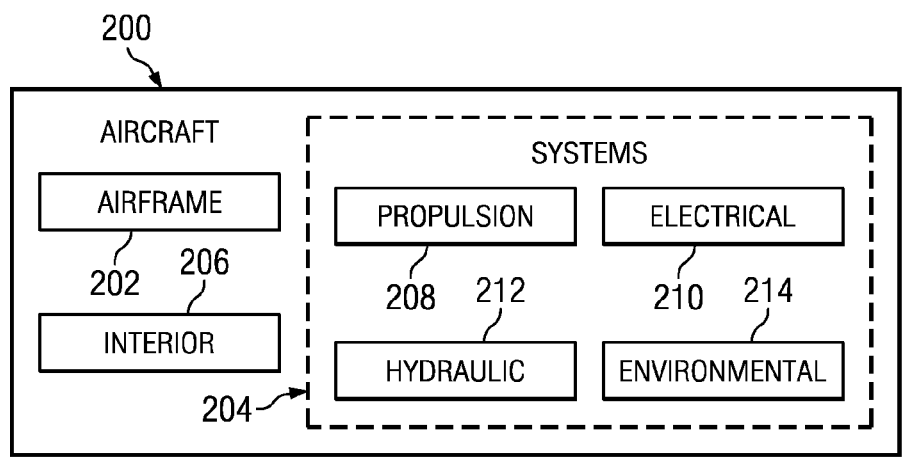
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 may include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items means, one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

For example, advantageous embodiments may be used to manufacture and/or assemble components of aircraft 200. One example of a component of aircraft 200 is airframe 202. During component and subassembly manufacturing 106 and system integration 108, a number of pieces of material for airframe 202 may be fastened together by drilling a number of holes in the number of pieces of material and fasteners may be activated using the number of holes. Advantageous embodiments may be used to create the number of holes such that the number of holes have the properties desired by the manufacturer. Examples of properties are position, size, shape, angle, and other suitable properties.

Although the different advantageous embodiments have been described with respect to aircraft, the different advantageous embodiments also recognize that some advantageous embodiments may be applied to other types of platforms. For example, without limitation, other advantageous embodiments may be applied to a mobile platform, a stationary platform, a land-based structure, an aquatic-based structure, a space-based structure and/or some other suitable object. More specifically, the different advantageous embodiments may be applied to, for example, without limitation, a submarine, a bus, a personnel carrier, tank, a train, an automobile, a spacecraft, a space station, a satellite, a surface ship, a power plant, a dam, a manufacturing facility, a building and/or some other suitable object.

The different advantageous embodiments recognize and take into account a number of different considerations. For example, without limitation, the different advantageous embodiments may recognize and take into account that it is desirable to maintain the relative position of a drill and a workpiece during a drilling operation.

A workpiece is made up of a number of layers of one or more materials. The workpiece is the target of the drilling operation. For example, manufacturing plans for an aircraft may call for three pieces of aluminum that make up a skin for a portion of the wing to be fastened together using a fastener. The fastener may be a screw. The three pieces of aluminum to be drilled through to create the hole for the fastener are referred to collectively as the workpiece.

A drilling operation, as used herein, is the use of a drill to create a hole in a number of layers of a workpiece. The drill may be powered by a motor. The different advantageous embodiments recognize that consistency in the properties of the number of holes created during a drilling operation may be achieved by preventing undesired movement of the drill and/or workpiece during a drilling operation.

The different advantageous embodiments also recognize that countersinking in a workpiece is a type of drilling operation. Countersinking is a process of creating a hole in which the head of the fastener used in the resulting hole may be positioned flush with the surface of the workpiece.

The different advantageous embodiments recognize that creating a countersunk hole may be performed using at least two operations. First, a workpiece may be positioned for the drilling operation. Then, a drill blanket may be positioned over the desired location for a hole in the workpiece. The drill may then be attached to locking screws in the drill blanket. The drill may then be activated, and the drill tool may be lowered to create the hole in the workpiece.

The drill tool may be removed from the resulting hole in the workpiece, and the drill may be detached from the drill blanket. The drill blanket may then be removed from the workpiece. The operator may then use a second tool to countersink the hole created by the drill.

In some examples, the operator may use a handheld motorized drill with a microstop cage attachment to countersink the hole. A microstop cage attachment is a tool that allows the attached motorized drill to drill to a precise depth in the workpiece. The microstop cage attachment is used in conjunction with a countersinking drill tool that allows the handheld motorized drill to countersink the hole to the depth for the fastener that will be used in the countersunk hole.

The operator may then position the handheld motorized drill over the previously drilled hole. The operator may then operate the handheld motorized drill with the microstop cage attachment in the previously drilled hole to countersink the previously drilled hole.

The different advantageous embodiments recognize that the two-stage process of drilling and countersinking the hole may lead to inconsistent results. In other words, a number of holes created with the same desired specifications using the two-stage process may vary from one another and/or not meet the desired specifications. The different advantageous embodiments recognize that the inconsistent results may be caused by the second stage of countersinking using the handheld motorized drill on the hole drilled in the first stage.

An operator operating the handheld motorized drill with the microstop cage attachment may cause the inconsistent results. For example, the operator may incorrectly position the handheld motorized drill. Alternatively, the operator may operate the handheld motorized drill at an angle that differs from the angle previously drilled by the drill during the first phase of the drilling operation.

An operator operating the handheld motorized drill may also cause the inconsistent results during the second stage of countersinking by exerting a force on the previously drilled hole with the drill tool being used with the microstop cage attachment. The operator may exert force on the previously drilled hole by moving and/or resting the drill tool on the previously drilled hole. The hole resulting from the countersink operation may be inconsistent with other countersunk holes drilled by the same operator with the same microstop cage attachment.

The different advantageous embodiments recognize that a one-stage drilling and countersinking process may increase productivity and/or decrease labor costs as compared to the two-stage process. The advantageous embodiments also recognize that by drilling and countersinking with the motorized drill in one stage, consistency of the holes created is improved over the two-stage process. Additionally, fewer workpieces may fail to meet the desired specifications. Therefore, fewer workpieces may be discarded.

Thus, the advantageous embodiments provide a method and apparatus for operating a drilling system. In an advantageous embodiment, an apparatus comprises a housing associated with a machine, a shaft, a sleeve, and a biasing system. The shaft is associated with the housing, and the shaft has an end configured to receive a tool. The shaft is configured to be rotated by the machine about an axis of rotation extending through the shaft. The sleeve is associated with the housing, and the sleeve has a channel that is configured to receive the shaft. The biasing system is associated with the housing and configured to move the sleeve along the axis of rotation against a workpiece on which a drilling operation is performed during which a sleeve end presses against the workpiece with a force while the shaft with the tool is rotated by the machine.

A first component is considered to be associated with a second component by being secured to the second component, bonded to the second component, fastened to the second component, and/or connected to the second component in some other suitable manner. The first component also may be connected to the second component through using a third component. The first component is also considered to be associated with the second component by being formed as part of and/or an extension of the second component.

Figure 3:
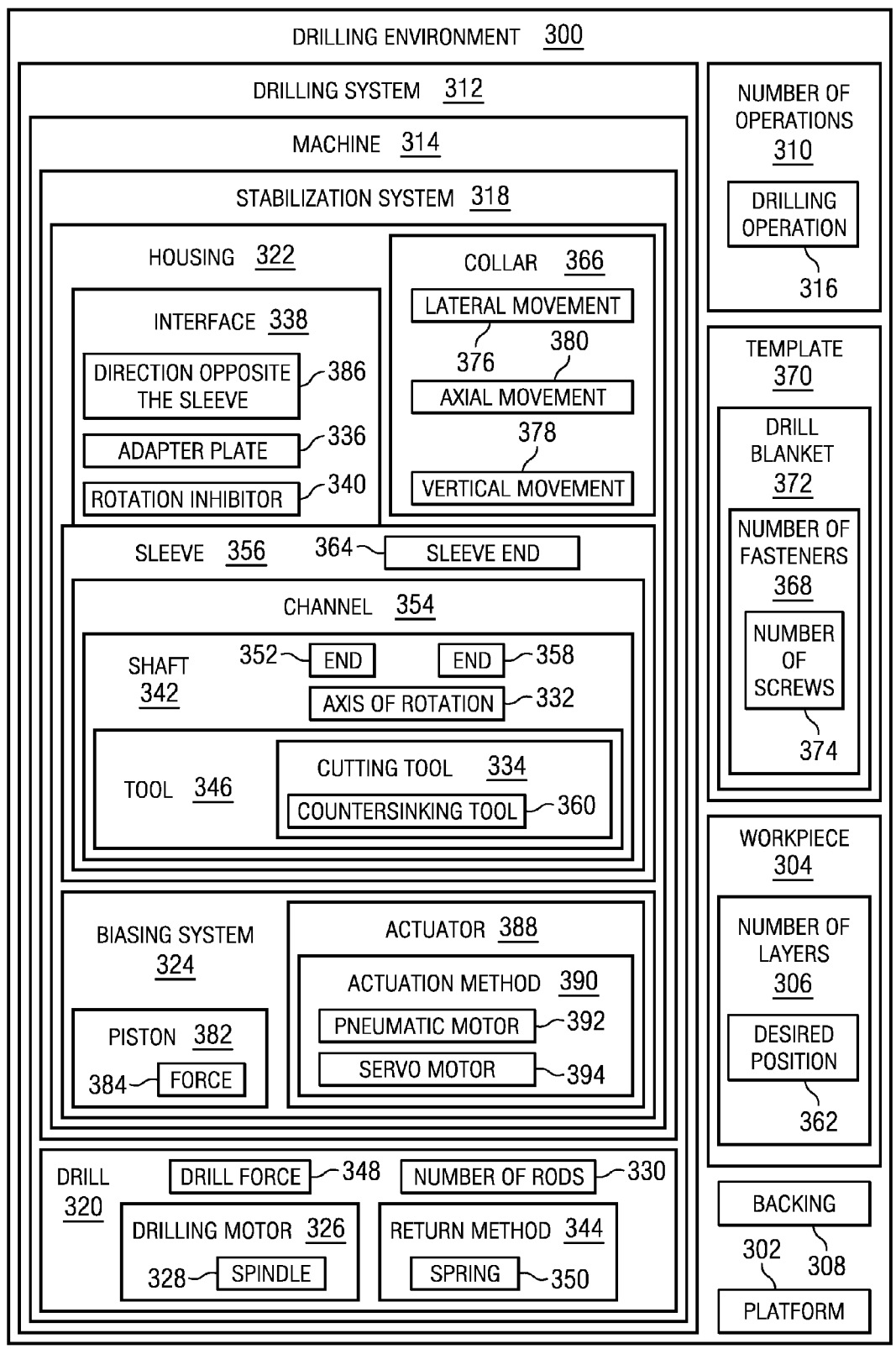
FIG. 3 depicts an illustration of a drilling environment in which drilling system operation may be performed in accordance with an advantageous embodiment.

Turning now to FIG. 3, an illustration of a drilling environment in which drilling system operation may be performed is depicted in accordance with an advantageous embodiment. Drilling environment 300 is an example of an environment that may be used to perform operations on workpieces for use in platform 302. Platform 302 may be, for example, aircraft 200 in FIG. 2.

As depicted, drilling environment 300 may be used to drill a number of holes in workpiece 304. Workpiece 304 comprises number of layers 306. Number of layers 306 is one or more materials to be drilled through. In this illustrative embodiment, number of layers 306 are to be fastened together after drilling. Workpiece 304 may be positioned on backing 308 prior to performing number of operations 310. Backing 308 is a support element for workpiece 304. Backing 308 may be, in an advantageous embodiment, a piece of scrap metal.

Drilling system 312 operates in drilling environment 352. Drilling system 312 comprise machine 314. Drilling system 312 may be used to perform number of operations 310. In this advantageous embodiment, number of operations 310 comprises drilling operation 316. In other advantageous embodiments, number of operations 310 comprises two or more drilling operations 316. Drilling operation 316 is a process in which drilling system 312 drills a number of holes in workpiece 304.

Drilling system 312 is made up of stabilization system 318. Stabilization system 318 may be the various parts that machine 314 uses to perform drilling operation 316. It is to be understood however, that drilling system 312 may comprise additional machines not depicted in this example. Stabilization system 318 may be any combination of drill 320, housing 322, biasing system 324, and/or any other suitable components not depicted in FIG. 3.

Drill 320 contains drilling motor 326. Drill 320 rotates spindle 328. Drilling motor 326 applies a torque that rotates spindle 328 by converting energy from another source using drilling motor 326. For example, drilling motor 326 may use electricity and/or compressed air to rotate spindle 328. Drill 320 may also be associated with number of rods 330. Number of rods 330 may be extend along axis of rotation 332 parallel to spindle 328. During number of operations 310, drilling motor 326 may travel along number of rods 330 toward workpiece 304 along axis of rotation 332. Spindle 328 and cutting tool 334 may be extended toward workpiece 304 as drilling motor 326 travels along number of rods 330 toward workpiece 304. In this advantageous embodiment, number of rods 330 are attached to drill 320 at an end. Number of rods 330 may also be associated with adapter plate 336. In this advantageous embodiment, number of rods 330 are bolted to adapter plate 336 to attach housing 322 to drill 320.

Adapter plate 336 may be a part of interface 338. Interface 338 may associate housing 322 with drill 320. For example, interface 338 may associate housing 322 with drill 320 by bolting on to drill 320. In this example, interface 338 allows drill 320 to receive stabilization system 318 but may be detached such that drill 320 may be operated without number of components or another stabilization system 318 may be received by drill 320.

Adapter plate 336 may also be associated with rotation inhibitor 340. Rotation inhibitor 340 may also be associated with housing 322. Because shaft 342 may rotate within housing 322, shaft 342 may cause housing 322 to rotate. Rotation inhibitor 340 prevents or reduces rotation of housing 322 during operation of drilling motor 326 by anchoring housing 322 to adapter plate 336, which is not rotated by shaft 342 because adapter plate 336 is associated with drill 320. For example, rotation inhibitor 340 may be a rod connected to housing 322 on one end. The rod extends through a hole in adapter plate 336.

Number of rods 330 in drill 320 may also function as a part of return method 344. Drilling motor 326 may be lowered by drill 320. Lowering drilling motor 326 may lower shaft 342 and/or tool 346. Lowering drilling motor 326 may cause tool 346 to extend from machine 314 along axis of rotation 332 to contact and/or penetrate workpiece 304. Once tool 346 is in contact with workpiece 304, drill 320 applies drill force 348 to workpiece 304 using tool 346 to cause tool 346 to penetrate workpiece 304. Return method 344 may apply force to drill 320 in a direction substantially opposite tool 346. Return method 344 may cause drilling motor 326 to return to a neutral position after drilling operation 316 is complete.

In one advantageous embodiment, return method 344 is spring 350. Spring 350 biases drill 320 to return to a neutral position. A neutral position is a resting position for drill 320 in which drilling motor 326 is inactive and tool 346 is retracted from workpiece 304.

Spindle 328 receives shaft 342. Shaft 342 extends along axis of rotation 332 at least partially through housing 322. Shaft 342 is rotated by spindle 328 when drilling motor 326 rotates spindle 328. Shaft 342 extends along axis of rotation 332. End 352 of shaft 342 is received by spindle 328. Shaft 342 extends along axis of rotation 332 through channel 354 in sleeve 356. Shaft 342 has a second end 358 that receives tool 346.

Tool 346 may be cutting tool 334. Tool 346 may contact and/or penetrate workpiece 304 during number of operations 310. In an advantageous embodiment, cutting tool 334 is a drill tool. In this example, cutting tool 334 is countersinking tool 360. Countersinking tool 360 drills through workpiece 304 and creates a countersunk hole in workpiece 304 when rotated and extended into workpiece 304 by drilling motor 326 using shaft 342. In an advantageous embodiment, tool 346 is interchangeable to allow for drilling operation 316 to involve a number of holes of different size, shape, and/or angle. In another advantageous embodiment, tool 346 is fixed on shaft 342 such that tool 346 is not interchangeable.

Sleeve 356 extends along axis of rotation 332 through housing 322. Sleeve 356 may be substantially cylindrical. Sleeve 356 contains channel 354 such that shaft 342 and/or tool 346 may travel through channel 354 along axis of rotation 332. Channel 354 may be a bearing surface for tool 346. A bearing surface is a surface that allows some directions of substantial movement, while disallowing other directions of substantial movement. In these advantageous embodiments, channel 354 is a bearing surface for tool 346 such that tool 346 may travel and rotate along axis of rotation 332. However, channel 354 may substantially prevent or reduce movement of tool 346 in a lateral direction. Sleeve 356 is associated on one end with biasing system 324. In one advantageous embodiment, sleeve 356 is attached to piston 382 on one end. Sleeve 356 is associated with biasing system 324 such that sleeve end 364 extends from piston 382 along axis of rotation 332. Sleeve end 364 is the end of sleeve 356 that may contact workpiece 304 during number of operations 310.

In an advantageous embodiment, machine 314 is positioned by positioning sleeve 356 in desired position 362. Desired position 362 is a position in workpiece 304 where a hole is to be drilled. When sleeve end 364 contacts workpiece 304, sleeve end 364 indicates the depth and angle drilling operation 316 will produce on workpiece 304.

Collar 366 may also contain at least a portion of sleeve 356. Collar 366 is an assembly that has a number of grooves in the outside surface of collar 366. In some advantageous embodiments, collar 366 is a lock collar. The grooves on collar 366 are capable of receiving the heads of number of fasteners 368 on template 370. Template 370 is a structure that guides and/or positions drilling system 312 in performing drilling operations to drill holes in workpiece 304. For example, template 370 may be drill blanket 372. In other advantageous embodiments, template 370 is a solid structure. The solid structure may be flat or curved to a desired contour. In some advantageous embodiments, template 370 is fastened to workpiece 304 using a number of fasteners 368. For example, template 370 may be fastened to workpiece 304 using screws and/or C-clamps. In such advantageous embodiments, backing 308 may be absent.

In this advantageous embodiment, drill blanket 372 is a surface positioned over workpiece 304 and in contact with workpiece 304. Drill blanket 372 may contain a number of bushings that allow tool 346 to travel through drill blanket 372 toward workpiece 304. Drill blanket 372 may also contain number of fasteners 368 secured to bushings within drill blanket 372. Number of fasteners 368 may be located substantially near the number of bushings that allow tool 346 to access to workpiece 304. In an advantageous embodiment, number of fasteners 368 are number of screws 374. For example, number of fasteners 368 may be a number of LS-0 lock screws from Carr Lane Manufacturing Co. in St. Louis, Mo.

Collar 366 may substantially eliminate lateral movement 376, vertical movement 378, and/or axial movement 380 of drilling system 312 during number of operations 310 by positioning drilling system 312 such that the heads of number of fasteners 368 that extend out from drill blanket 372 away from workpiece 304 may be located within the grooves in collar 366 on a number of sides of collar 366. Lateral movement 376 is a movement of drilling system 312 laterally. Lateral movement 376 may be substantially parallel to workpiece 304 and/or template 370.

Vertical movement 378 is a movement of drilling system 312 in a direction opposite the sleeve 386. That is, vertical movement 378 is movement by drilling system 312 away from workpiece 304. Vertical movement 378 may be caused by force 384 applied by biasing system 324. In an advantageous embodiment, the grooves in collar 366 make contact with the heads of number of fasteners 368 on at least two sides.

Axial movement 396 is a movement of drilling system 312 along axis of rotation 332 in direction opposite the sleeve 386. Axial movement 396 may occur during drilling operation 316 as drill force 348 is applied to workpiece 304. When the grooves in collar 366 are in contact with the heads of number of fasteners 368 on a number of sides of collar 366, collar 366 substantially eliminates lateral movement 376, vertical movement 378, and/or axial movement 380.

Biasing system 324 may bias sleeve 356 toward workpiece 304 when biasing system 324 is engaged. When biasing system 324 is engaged, sleeve 356 may be in contact with workpiece 304. Biasing system 324 may comprise piston 382 and actuator 388. Actuator 388 may cause piston 382 to bias sleeve 356. As a result, sleeve 356 may apply force 384 to workpiece 304. Actuator 388 may be actuated using actuation method 390. In some advantageous embodiments, actuation method 390 is pneumatic motor 392. In other advantageous embodiments, actuation method 390 is servo motor 394, however, it is to be understood any suitable actuation method may be used.

When force 384 is applied to workpiece 304 by piston 382 using sleeve 356, an opposite force away from workpiece 304 in direction opposite the sleeve 386. Collar 366 reduces or prevents vertical movement 378 in direction opposite the sleeve 386. Housing 322 may remain in a fixed position as force 384 is applied to workpiece 304.

Sleeve 356 may apply force 384 to workpiece 304, thus ensuring that number of layers 306 remain substantially in desired position 362 during drilling operation 316. In these examples, sleeve 356 is moved against workpiece 304 such that sleeve 356 directly contacts workpiece 304. In these illustrative examples, "directly contacts" means that no intervening objects are present between sleeve 356 and workpiece 304 when piston 382 is fully engaged.

During drilling operation 316, tool 346 travels along axis of rotation 332 toward workpiece 304. Sleeve 356 applies force 384 to workpiece 304 while allowing tool 346 to travel toward workpiece 304 in channel 354 along axis of rotation 332.

Number of layers 306 remain substantially in desired position 362 during drilling operation 316 because sleeve 356 contacts number of layers 368 and sleeve 356 applies force 384 to number of layers 306. Because number of layers 306 remain substantially in desired position 362 during drilling operation 316, the results of drilling operation 316 on workpiece 304 are consistent and meet desired specifications for the number of holes in workpiece 304. In an advantageous embodiment, drilling operation 316 is also a countersinking operation. In such an advantageous embodiment, consistency and accuracy to specification is improved over a two-stage drilling and countersinking process in which an operator performs the countersinking after the initial hole is drilled using a handheld motorized drill.

The illustration of drilling system 312 in drilling environment 300 is not meant to imply physical or architectural limitations to the manner in which different features may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, in some advantageous embodiments, drilling motor 326 is driven by a number of servos. In other advantageous embodiments, drilling motor 326 may be a pneumatically driven motor. In some advantageous embodiments, number of fasteners 368 are a number of bolts. In advantageous embodiments, stabilization system 318 comprises more components or fewer components. For example, in an advantageous embodiment, stabilization system 318 does not comprise interface 338. In such an advantageous embodiment, housing 322 is fixably attached to drill 320. In some advantageous embodiments, drilling system 312 is controlled by a human. However, in other advantageous embodiments, drilling system 312 is operated by a robot or other computer-controlled machine. In yet other advantageous embodiments, stabilization system 318 is within drill 320 and/or attached to drill 320 such that stabilization system 318 is not interchangeable. In such advantageous embodiments, interface 338 and/or adapter plate 336 may be absent.

Figure 4:
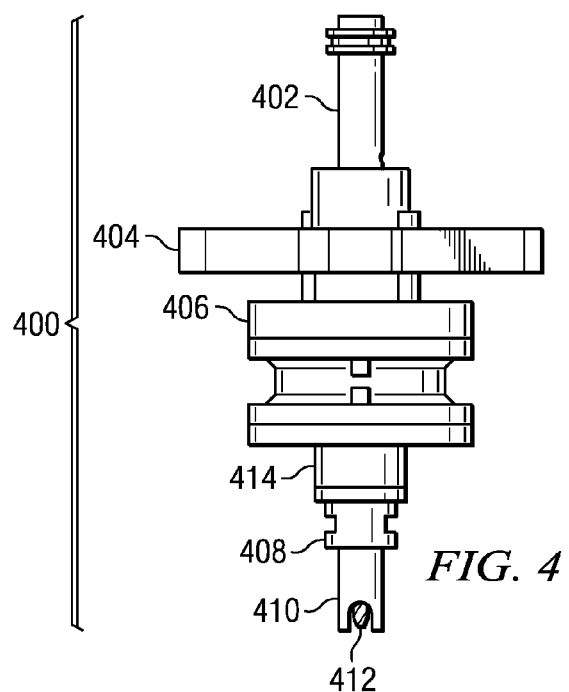
FIG. 4 depicts a stabilization system from an exterior view in accordance with an advantageous embodiment.

Turning now to FIG. 4, a stabilization system is depicted from an exterior view in accordance with an advantageous embodiment. In this advantageous embodiment, stabilization system 400 is an example of one implementation of stabilization system 318 in FIG. 3.

In this advantageous embodiment, stabilization system 400 may include shaft 402, adapter plate 404, housing 406, interchangeable plate 414, collar 408, sleeve 410, and cutting tool 412. Shaft 402 may be an example of shaft 342, adapter plate 404 may be an example of adapter plate 336, and housing 406 may be an example of housing 322. Collar 408 may be an example of collar 366, sleeve 410 may be an example of sleeve 356, and cutting tool 412 may be an example of cutting tool 334. In the advantageous embodiment depicted, sleeve 410 is retracted and stabilization system 400 is in a neutral or rest state.

Interchangeable plate 414 may be removably attached to housing 406. Interchangeable plate 414 may be removed and/or replaced with another interchangeable plate 414. Interchangeable plate 414 is configured to receive collar 408. Collar 408 has grooves that receive the head of a particular size and configuration of fastener attached to a drill blanket. Collar 408 may be replaced with a different collar 408 for accommodating a different size and/or configuration of fastener head. Accordingly, interchangeable plate 414 may be removed from housing 406 and/or replaced with an interchangeable plate 414 of a different size to receive a different collar 408. Of course, it will be appreciated that in some advantageous embodiments, housing 406 does not have interchangeable plate 414 and is configured for a particular collar 408.

Sleeve 410 may also be removably attached to housing 406. In other words, sleeve 410 may be removed and/or replaced with another sleeve 410. In one advantageous embodiment, sleeve 410 is replaced to use a cutting tool 412 of a different size. Alternatively, sleeve 410 may be replaced to use a template with a different configuration. For example, a second sleeve 410 may be installed to perform a drilling operation using a drill blanket with bushings of a different size and/or configuration.

Figure 5:
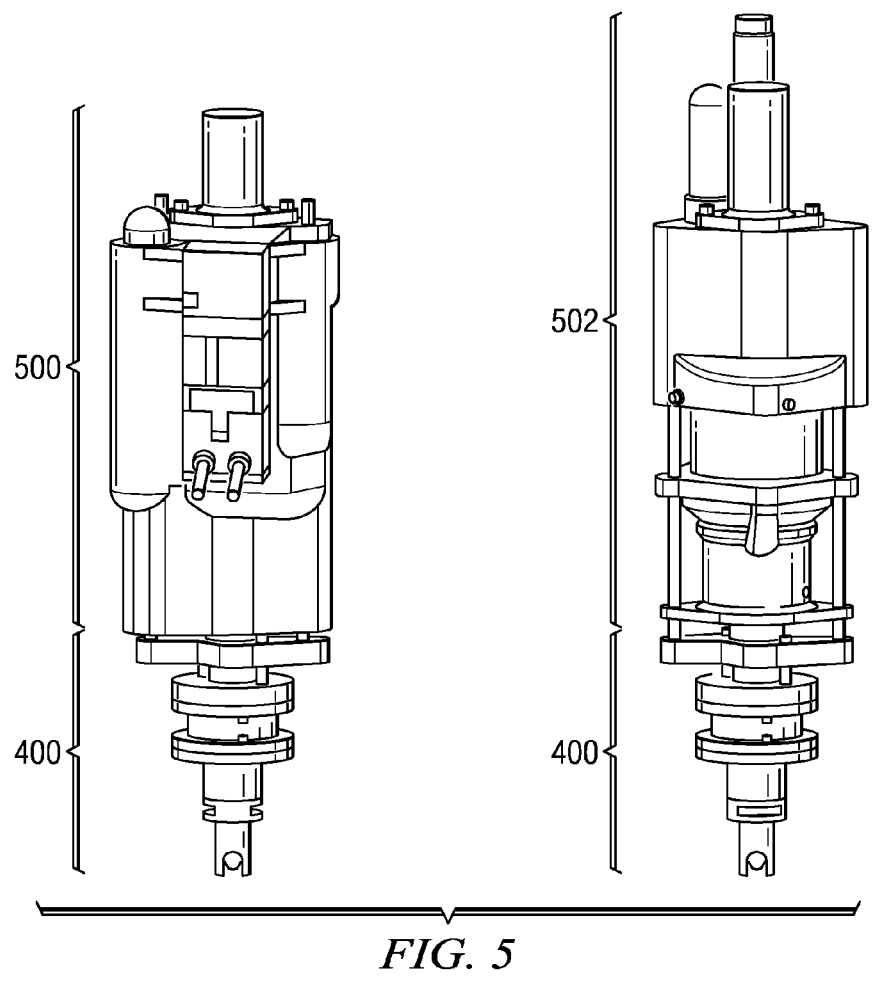
FIG. 5 depicts two drills in which advantageous embodiments may be implemented.

Turning now to FIG. 5, two drills are depicted in which advantageous embodiments may be implemented. In these illustrative examples, drill 500 generates rotational force using a number of servos and/or an air motor. Drill 500 is depicted with stabilization system 400 attached. Drill 502 may be a second type of drill configured for attachment to stabilization system 400. Drill 502 may be a drill that generates rotational force using compressed air. For example, drill 502 may be a pneumatic drill. Drill 502 is also depicted with stabilization system 400 attached.

Drill 500 and drill 502 are only two examples of machines to which stabilization system 400 may be attached, and the depiction of drill 500 and drill 502 should not be construed as a limitation. In other advantageous embodiments, stabilization system 400 may be attached to a punch tool.

Figure 6:
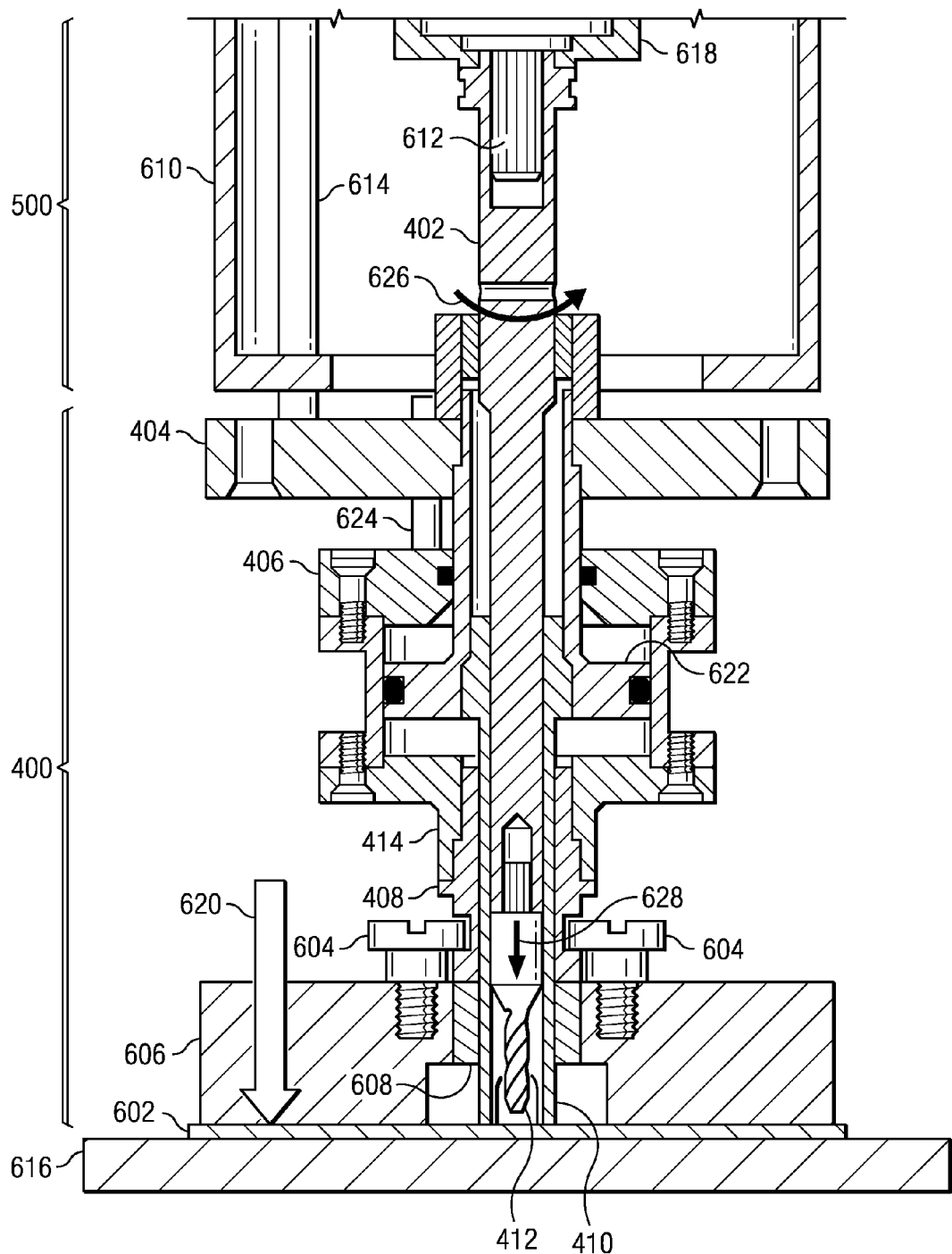
FIG. 6 depicts a cross-sectional view of a stabilization system in accordance with an advantageous embodiment.

Turning now to FIG. 6, a cross-sectional view of a stabilization system is depicted in accordance with an advantageous embodiment. In this example, stabilization system 400 may be attached to drill 500 from FIG. 5.

In this advantageous embodiment, stabilization system 400 may include shaft 402, adapter plate 404, housing 406, interchangeable plate 414, collar 408, sleeve 410, and cutting tool 412. Shaft 402 may be an example of shaft 342, adapter plate 404 may be an example of adapter plate 336, and housing 406 may be an example of housing 322. Collar 408 may be an example of collar 366, sleeve 410 may be an example of sleeve 356, and cutting tool 412 may be an example of cutting tool 334. In this advantageous embodiment, sleeve 410 is engaged against workpiece 602 by piston 622. Piston 622 is an example of piston 382. However, cutting tool 412 is not extended to contact and/or penetrate workpiece 602 in this example.

In this illustrative example, drill 500 includes drill housing 610, spindle 612, and rod 614. Spindle 612 is an example of spindle 328 and rod 614 is an example of number of rods 330. Prior to beginning a drilling operation, drill 500 and stabilization system 400 are positioned such that screws 604 engage grooves in collar 408. The contact between screws 604 and collar 408 substantially eliminates lateral, vertical, and axial movement of drill 500 and/or stabilization system 400 during the drilling operation.

Prior to beginning the drilling operation, workpiece 602 is positioned beneath drill blanket 606. Workpiece 602 is positioned such that sleeve 410 and cutting tool 412 may contact the desired location on workpiece 602 for the hole to be drilled through bushing 608. Once workpiece 602 is positioned, piston 622 is engaged by an actuator and sleeve 410 is extended toward workpiece 602 and applies force 620 to workpiece 602 toward backing 616. In an illustrative embodiment, force 620 is applied to workpiece 602 such that workpiece 602 is substantially fixed between sleeve 410 and backing 616. Backing 616 is an example of backing 308 from FIG. 3. Force 620 is an example of force 384 from FIG. 3.

The countersunk hole is drilled by activating the drilling motor 618. Drilling motor 618 is an example of drilling motor 326 from FIG. 3. Drilling motor 618 causes spindle 612 to rotate. Rotation of spindle 612 causes shaft 402 and cutting tool 412 to rotate by applying torque 626 to shaft 402. Rotation inhibitor 624 prevents or reduces rotation of housing 406. Rotation inhibitor 624 is an example of rotation inhibitor 340 in FIG. 3.

Drilling motor 326 is lowered to cause cutting tool 412 to contact and/or penetrate workpiece 602. Drilling motor 618 may be lowered by an operator and/or by a robot or computer controller. Drilling motor 618 may be configured such that, once sleeve 410 begins applying force 620 to workpiece 602, drilling motor 618 may not be lowered past the desired countersink depth that is appropriate for the screws to be applied to the countersunk hole. As drilling motor 618 is lowered and cutting tool 412 contacts workpiece 602, drilling motor 618 uses applies drill force 629 to workpiece 602 using cutting tool 412. Drill force 628 is an example implementation of drill force 348 from FIG. 3.

FIG. 7, FIG. 8, FIG. 9, and FIG. 10 depict an illustration of drilling a countersunk hole in a workpiece in three steps in accordance with an advantageous embodiment.

Figure 7:
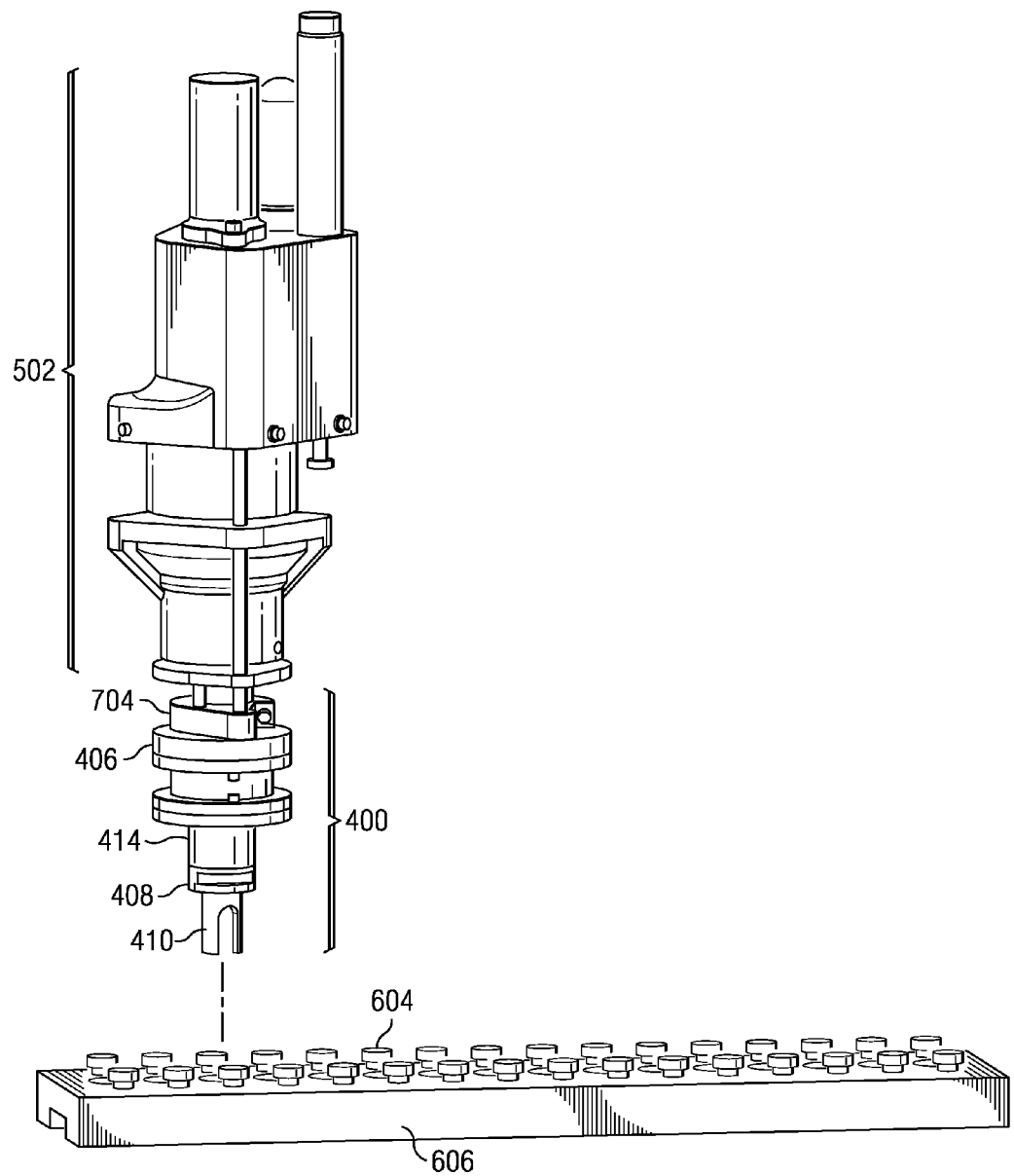
FIG. 7 depicts the first step of drilling a countersunk hole in a workpiece in accordance with an advantageous embodiment.

Turning now to FIG. 7, the first step of drilling a countersunk hole in a workpiece in accordance with an advantageous embodiment is depicted. Drill 502 with stabilization system 400 attached may be an example of drilling system 312 from FIG. 3. Drill 502 with stabilization system 400 attached may be positioned over the hole to be drilled in the workpiece. The location of the hole to be drilled on the workpiece may be accessible through a bushing in drill blanket 606.

Stabilization system 400 may be attached to drill 502 using adapter plate 704. Adapter plate 704 may differ from adapter plate 404 in FIG. 4 because drill 502 may have a different configuration for attachment than drill 500.

Figure 8:
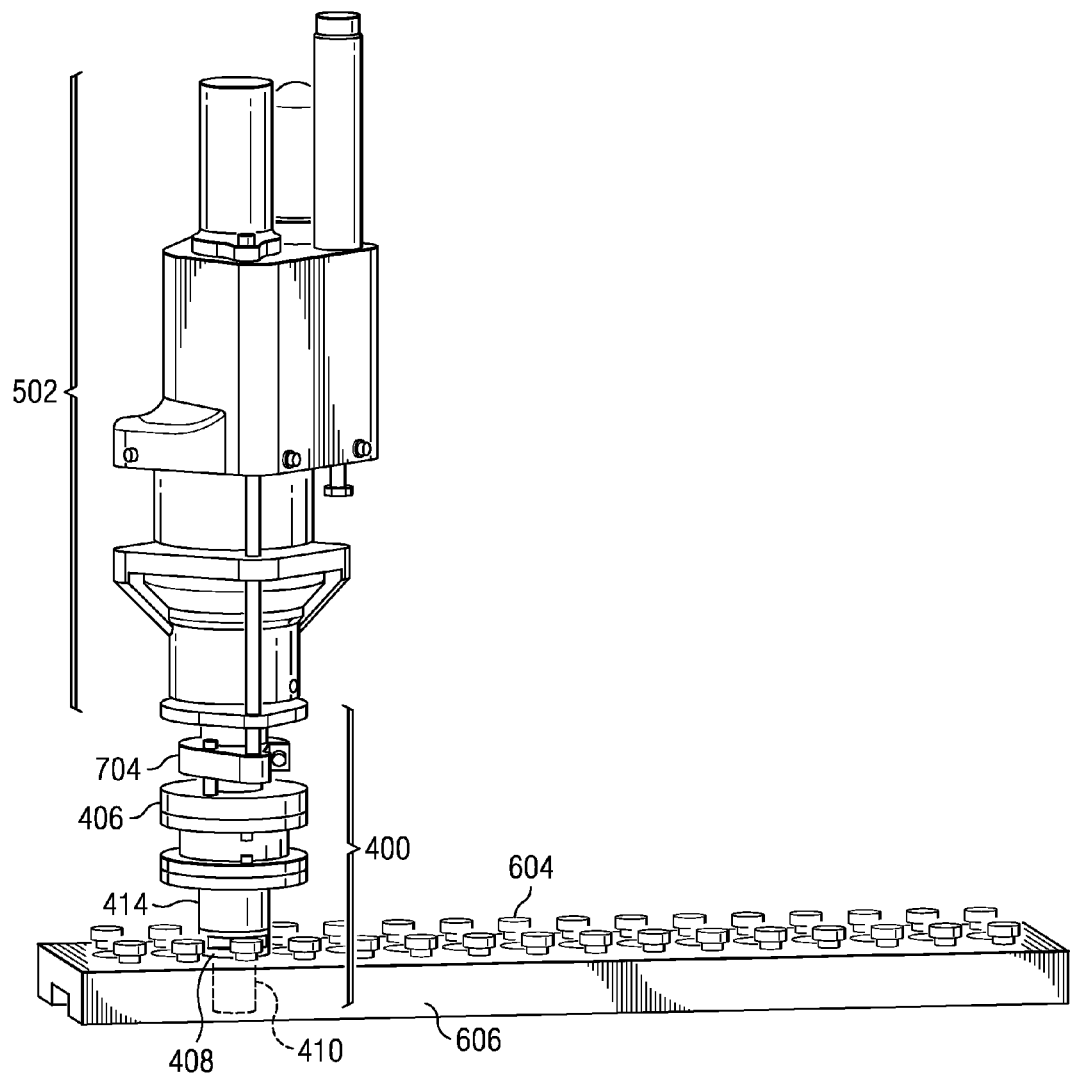
FIG. 8 depicts the second step of drilling a countersunk hole in a workpiece from an exterior view in accordance with an advantageous embodiment.

Turning now to FIG. 8, the second step of drilling a countersunk hole in a workpiece from an exterior view in accordance with an advantageous embodiment is depicted. Drill 502 with stabilization system 400 attached may now be in position for drilling. Drill 502 may have been lowered into the bushing in drill blanket 606. Lock screws 604 may be in contact with collar 408 such that lateral, vertical, and axial movement of drill 502 and/or stabilization system 400 may be substantially eliminated. Sleeve 410 may now be at least partially within the bushing in drill blanket 606.

Figure 9:
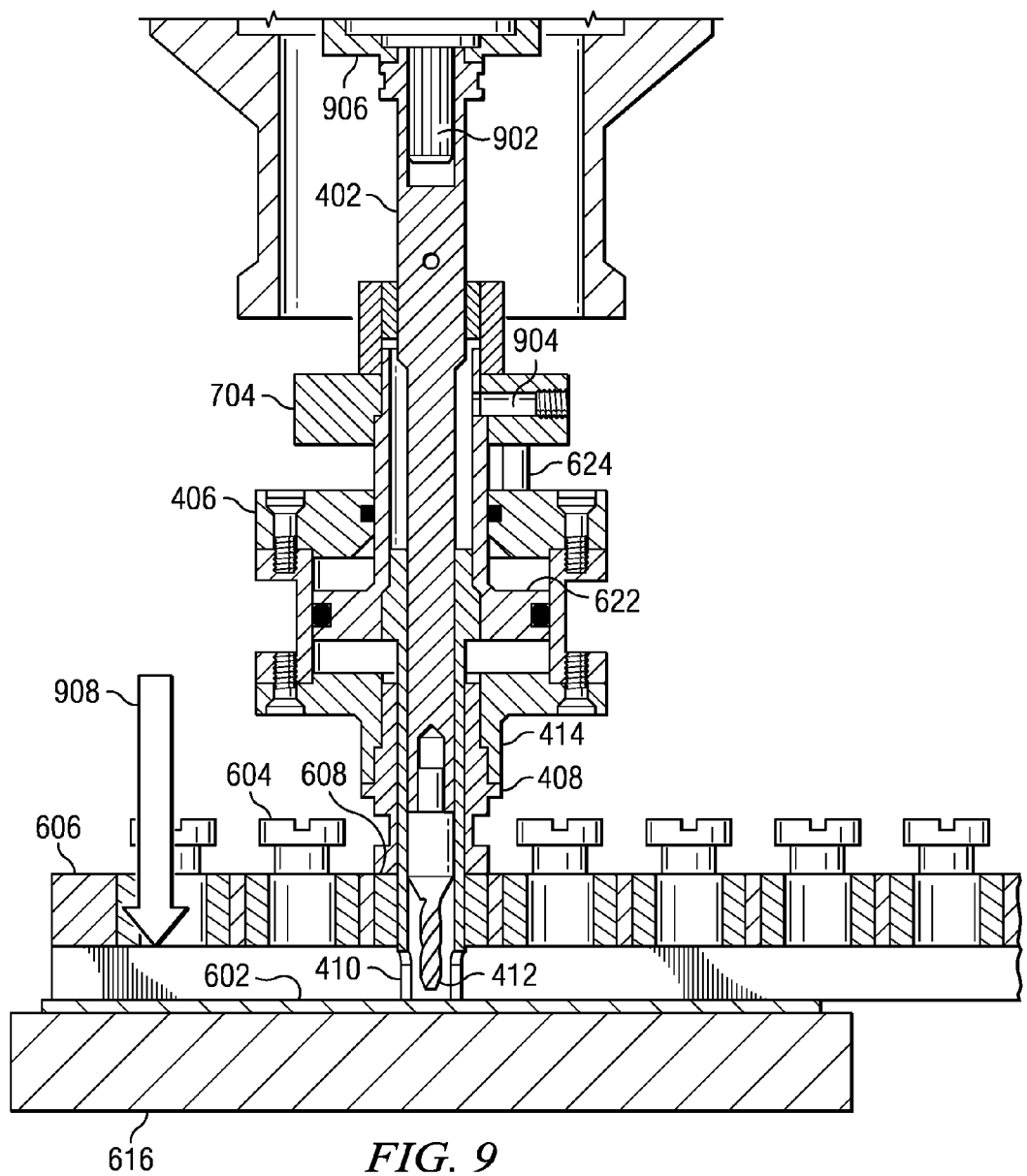
FIG. 9 depicts the second step of drilling a countersunk hole in a workpiece from a cross-sectional view in accordance with an advantageous embodiment.

Turning now to FIG. 9, the second step of drilling a countersunk hole in a workpiece from a cross-sectional view in accordance with an advantageous embodiment is depicted. Drill 502 with stabilization system 400 attached may now be in position for drilling. Drill 502 may have been lowered into the bushing in drill blanket 606. Lock screws 604 may be in contact with collar 408 such that lateral, vertical, and axial movement of drill 502 and/or stabilization system 400 may be substantially eliminated. Sleeve 410 may now be at least partially within the bushing in drill blanket 606.

Piston 622 is then engaged such that sleeve 410 applies a force 908 to workpiece 602. Force 908 is an illustrative example of force 384 in FIG. 3. Workpiece 602 is substantially fixed between sleeve 410 and backing 616. When drilling begins, air and/or coolant may be supplied to cutting tool 412 through hole 904.

Figure 10:
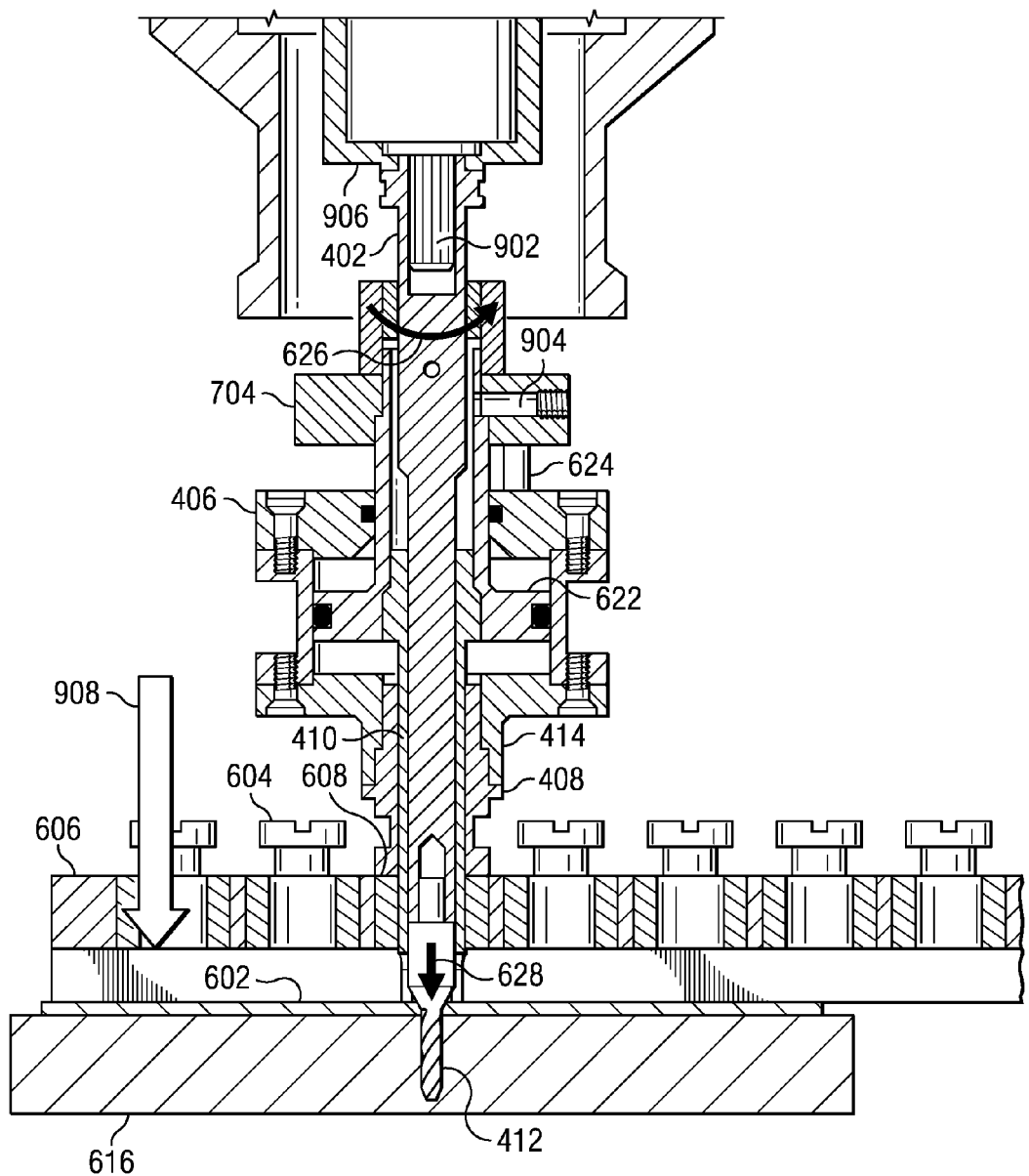
FIG. 10 depicts the third step of drilling a countersunk hole in a workpiece from cross-sectional view in accordance with an advantageous embodiment.

Turning now to FIG. 10, the third step of drilling a countersunk hole in a workpiece from cross-sectional view in accordance with an advantageous embodiment is depicted.

Once force 908 is applied to workpiece 602, drilling motor 906 may be configured to drill to the countersink depth for the current drilling operation. Drilling motor 906 may be configured for the countersink depth because sleeve 410 has established a plane for the drilling operation by applying force 908 to workpiece 602. Drilling motor 906 may then be engaged, causing spindle 902 to rotate shaft 402 and cutting tool 412. In this advantageous embodiment, cutting tool 412 is a countersinking drill tool. Cutting tool 412 drills through workpiece 602 by applying drill force 628 and creates a countersunk hole in workpiece 602.

Drilling motor 906 may be prevented from extending any farther toward workpiece 602 by drill motor 906. Thus, the drilling motor 906 lowers to the appropriate depth for the size fastener that will be used in the countersunk hole and the size collar 408 presently associated with interchangeable plate 414. Once the drilling operation is complete, drilling motor 906 may be disengaged. Piston 622 may be reversed, and sleeve 410 may return to a neutral position.

Figure 11:
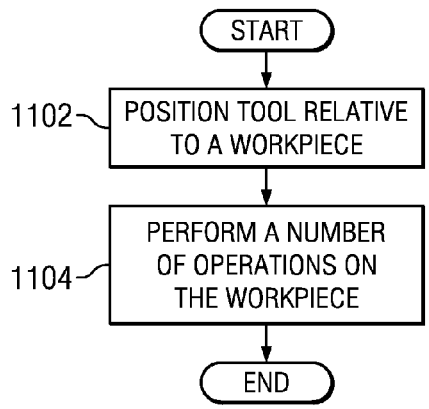
FIG. 11 depicts an illustration of a flowchart of a process for operating a drilling system in accordance with an advantageous embodiment.

Turning now to FIG. 11, an illustration of a flowchart of a process for operating a drilling system is depicted in accordance with an advantageous embodiment. The process may be implemented in drilling environment 300 using drilling system 312.

The process begins by positioning the drilling system relative to a workpiece (operation 1102). In an advantageous embodiment, the drilling system comprises a housing associated with a machine, a shaft associated with the housing, the shaft having an end configured to receive a tool, the shaft being configured to be rotated by the machine about an axis of rotation extending through the shaft, a sleeve associated with the housing, wherein the sleeve has a channel that is configured to receive the shaft, and a biasing system associated with the housing and configured to move the sleeve along the axis of rotation against a workpiece on which a drilling operation is performed during which a sleeve end presses against the workpiece with a force while the shaft with the tool is rotated by the machine. The process then performs a number of operations on the workpiece using the drilling system (operation 1104). The process terminates thereafter.

Figure 12:
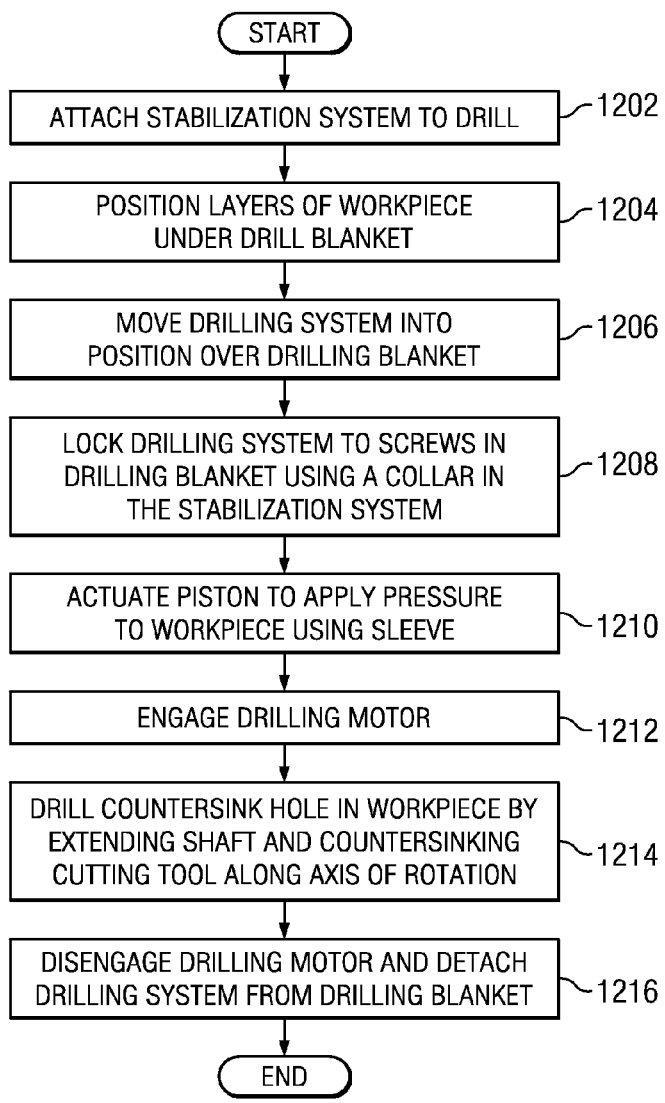
FIG. 12 depicts a flowchart of a process for drilling a countersunk hole in a workpiece in accordance with an advantageous embodiment.

Turning now to FIG. 12, a process for drilling a countersunk hole in a workpiece is depicted in accordance with an advantageous embodiment. The process may be implemented in drilling environment 300 using drilling system 312.

The process begins by attaching the stabilization system to the drill (operation 1202). In an advantageous embodiment, the stabilization is attached to the drill by bolting the stabilization to a rod associated with the drill. The process then positions layers of the workpiece under a drill blanket (operation 1204).

The process continues by moving the drilling system into position over the drilling blanket (operation 1206). In an advantageous embodiment, the position over the drilling blanket is also over a bushing that provides access through the drilling blanket through which the cutting tool may travel. The bushing may also be used to identify the location of the hole to be drilled. The process then locks the drilling system to screws in the drilling blanket using a collar in the stabilization system (operation 1208).

The process then actuates the piston to apply pressure to the workpiece using the sleeve (operation 1210). The process then engages the drilling motor (operation 1212).

The process then drills a countersunk hole in the workpiece by extending the shaft and the countersinking cutting tool along the axis of rotation (operation 1214). In an advantageous embodiment, the shaft and countersinking cutting tool are extended along the axis of rotation by lowering the drilling motor within the drill. The process then disengages the drilling motor and detaches the drilling system from the drilling blanket (operation 1216). The process terminates thereafter.

The flowchart and block diagrams of the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the blocks may occur out of the order noted in the figures. For example, without limitation, in some cases, two blocks shown in succession may be executed substantially concurrently, or the blocks may sometimes be executed in the reverse order, depending upon the functionality involved. Also, other blocks may be added in addition to the illustrated blocks in the flowchart or block diagram.

Thus, the advantageous embodiments provide a method and apparatus for operating a drilling system. In an advantageous embodiment, an apparatus comprises a housing associated with a machine, a shaft, a sleeve, and a biasing system. The shaft is associated with the housing, and the shaft has an end configured to receive a tool. The shaft is configured to be rotated by the machine about an axis of rotation extending through the shaft. The sleeve is associated with the housing, and the sleeve has a channel that is configured to receive the shaft. The biasing system is associated with the housing and configured to move the sleeve along the axis of rotation against a workpiece on which a drilling operation is performed during which a sleeve end presses against the workpiece with a force while the shaft with the tool is rotated by the machine.

The description of the different advantageous embodiments has been presented for purposes of illustration and description, and is not intended to be exhaustive or limited to the embodiments in the form disclosed. Many modifications and variations will be apparent to those of ordinary skill in the art.

Although the different advantageous embodiments have been described with respect workpieces for use in aircraft, the different advantageous embodiments also recognize that some advantageous embodiments may be applied to workpieces for other types of platforms. For example, without limitation, other advantageous embodiments may be applied performing operations on workpieces for a mobile platform, a stationary platform, a land-based structure, an aquatic-based structure, a space-based structure and/or some other suitable object. More specifically, the different advantageous embodiments may be applied to performing operations on workpieces, for example, without limitation, a submarine, a bus, a personnel carrier, tank, a train, an automobile, a spacecraft, a space station, a satellite, a surface ship, a power plant, a dam, a manufacturing facility, a building and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a housing associated with a machine;
   a shaft associated with the housing, the shaft having an end configured to receive a tool, the shaft being configured to be rotated by the machine about an axis of rotation extending through the shaft;
   a sleeve associated with the housing, wherein the sleeve has a channel that is configured to receive the shaft;
   a biasing system associated with the housing and configured to move the sleeve along the axis of rotation against a workpiece on which a drilling operation is performed during which a sleeve end presses against the workpiece with a force while the shaft with the tool is rotated by the machine; and a collar associated with the housing and configured to be removably attached to a number of fasteners.

2. The apparatus of claim 1, wherein the shaft is further configured to move along the axis of rotation during the drilling operation.

3. The apparatus of claim 1, wherein the housing is an interface attached to the machine.

4. The apparatus of claim 3, wherein the machine is a drill.

5. The apparatus of claim 1, wherein the biasing system further comprises a piston and an actuator.

6. The apparatus of claim 5, wherein the actuator uses an actuation method selected from a pneumatic motor and a servo motor.

7. The apparatus of claim 1, further comprising:
   a cutting tool, contained at least partially within the sleeve and configured to move along the axis of rotation.

8. The apparatus of claim 1, wherein the number of fasteners are a number of screws associated with a drill blanket.

9. The apparatus of claim 1, wherein the workpiece comprises a plurality of layers and wherein the force substantially maintains the plurality of layers in a desired position relative to each other.

10. An apparatus comprising:
a housing removably attached to a number of rods using an adapter plate, the number of rods being associated with a drill containing a drilling motor such that the drilling motor moves along the number of rods during a drilling operation;
a shaft having a first end configured to receive a drill tool and a second end configured to receive a spindle associated with the drilling motor, the shaft being configured to be rotated by the spindle about an axis of rotation when the spindle is caused to rotate by the drilling motor;
a sleeve associated with the housing, wherein the sleeve has a channel that is configured to receive the shaft;
a piston at least partially contained within the housing and configured to press a sleeve end against a workpiece during the drilling operation with a force while the shaft is rotated by the spindle; and a collar associated with the housing and configured to be removably attached to a number of fasteners.

11. The apparatus of claim 10, wherein the collar is removably attached to a number of fasteners on a drill blanket and the collar is configured to reduce a movement of the drilling motor in a lateral direction and a vertical direction.

12. The apparatus of claim 10, wherein the channel receives the drill tool and provides a bearing surface for the drill tool.

13. A method for operating a drilling system comprising:
positioning the drilling system relative to a workpiece, wherein the drilling system comprises a housing associated with a machine, a shaft associated with the housing, the shaft having an end configured to receive a tool, the shaft being configured to be rotated by the machine about an axis of rotation extending through the shaft, a sleeve associated with the housing, wherein the sleeve has a channel that is configured to receive the shaft, and a biasing system associated with the housing and configured to move the sleeve along the axis of rotation against a workpiece on which a drilling operation is performed during which a sleeve end presses against the workpiece with a force while the shaft with the tool is rotated by the machine, and a collar associated with the housing is removably attached to a number of fasteners on a drill blanket and the collar is configured to reduce a movement of the drilling motor in a lateral direction and a vertical direction; and
performing a number of operations on the workpiece using the drilling system.

14. The method of claim 13, wherein the shaft is further configured to move along the axis of rotation during the drilling operation.

15. The method of claim 14, wherein the housing is an interface attached to the machine.

16. The method of claim 15, wherein the tool is a countersinking tool.

17. The method of claim 15, wherein the biasing system further comprises a piston and an actuator.

* * * * *